Figure 2:
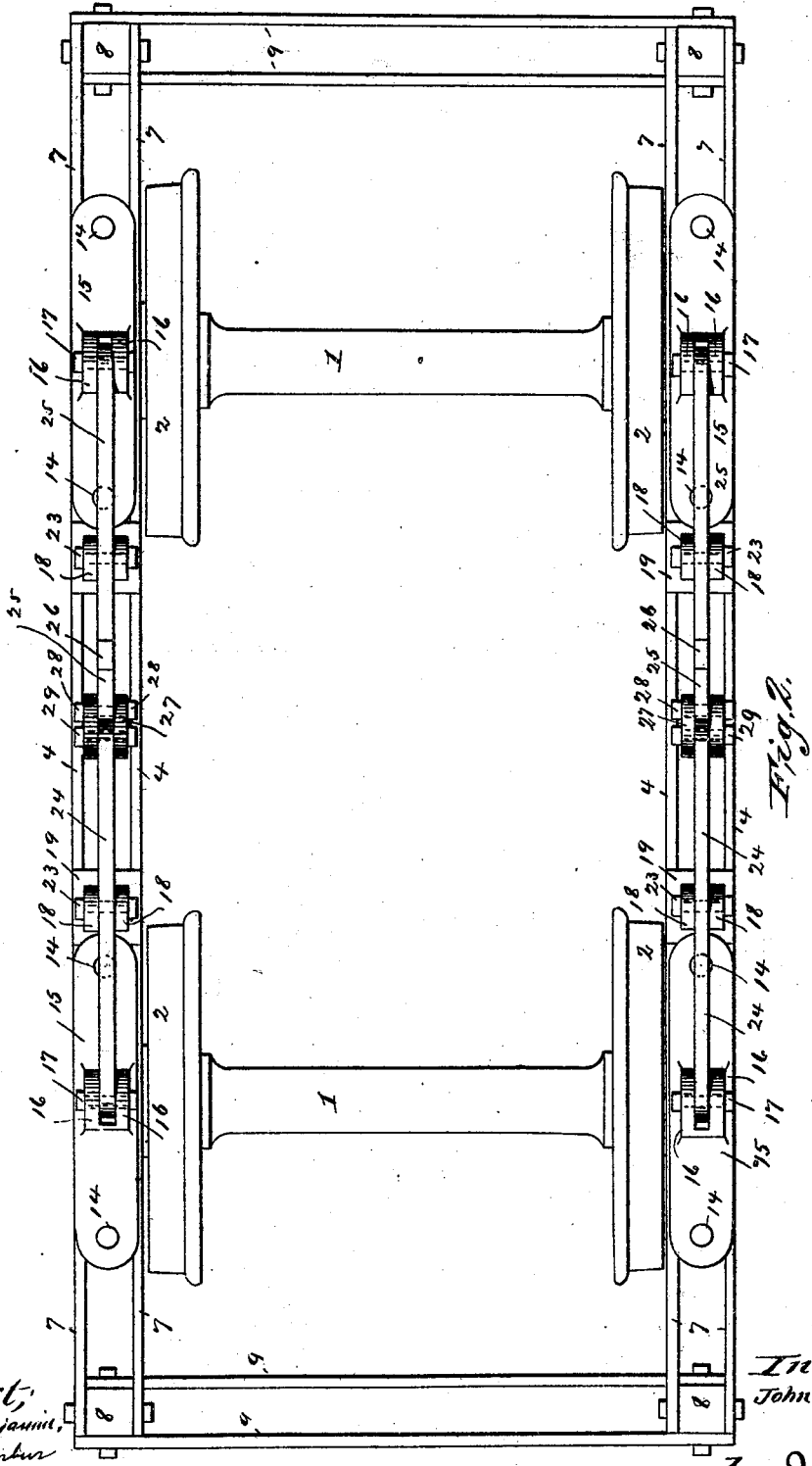

(No Model.) 2 Sheets—Sheet 1.
J. GOSNEY.
EQUALIZING DEVICE FOR CARS.
No. 500,573. Patented July 4, 1893.
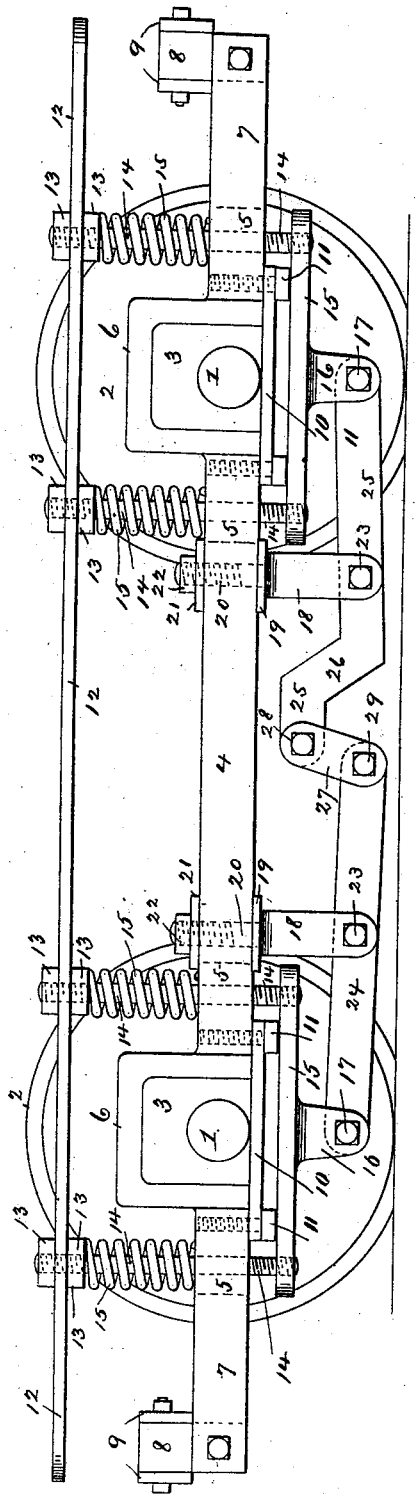
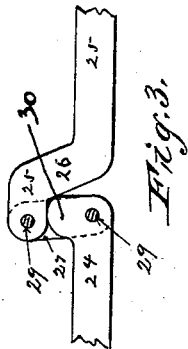
Attest,
C. W. Benjamin,
J. F. Dunbar
Inventor,
John Gosney,
by Joseph R. Levy,
atty (No Model.) 2 Sheets—Sheet 2.

J. GOSNEY.
EQUALIZING DEVICE FOR CARS.

No. 500,573. Patented July 4, 1893.

Attest,
C. W. Benjamin,
H. F. Durbin.

Inventor,
John Gosney,
by Joseph L. Levy
atty

UNITED STATES PATENT OFFICE.

JOHN GOSNEY, OF WILMINGTON, DELAWARE, ASSIGNOR TO JOHN A. BRILL, OF PHILADELPHIA, PENNSYLVANIA.

EQUALIZING DEVICE FOR CARS.

SPECIFICATION forming part of Letters Patent No. 500,573, dated July 4, 1893.

Application filed February 23, 1893. Serial No. 463,326. (No model.)

*To all whom it may concern:*

Be it known that I, JOHN GOSNEY, a citizen of the United States, residing at Wilmington, in the county of New Castle and State of Delaware, have made certain new and useful Improvements in Equalizing Devices for Cars, of which the following is a specification.

My invention has reference to that particular class of devices used for the purpose of equalizing the weight or pressure of the car body on the truck, when superior at one end, so as to bring both ends of the car and truck down evenly on the springs, and keep the car body level. The art, as far as I know the same at present, is illustrated in the patents granted to H. J. Tate, No. 287,827, dated August 14, 1888; J. A. Brill, No. 418,440, dated December 31, 1889, and Brill and Adams, No. 476,244, dated June 7, 1892. In all these patents the equalizing devices comprise bars or levers which are secured at the top to the upper chord of the truck, or the car flooring, the fulcrum of such levers being upon the axle box frame of the truck, or upon stirrups by which the axle box frame is supported on the axle, and which forms practically a part of the axle box frame. In all these devices the power to operate these levers is obtained by downward and upward movements of the car body on its springs from a point without the wheel base of the car body, or truck, which has necessitated the use of long levers.

The primary object of my invention is to construct a device which will accomplish the purpose of equalizing the load on the car, or truck, wherein levers having arms which will not extend beyond the wheel base of the truck, and which lie beneath the axle boxes and axle box frame, are used, they being fulcrumed within the wheel base, their power ends being secured to a movable part of the truck, or running gear of the car, which is co-extensive with the wheel base of the truck or running gear itself.

My invention is in like manner applicable to trucks having an upper chord, or to trucks wherein the axle box pedestals are secured directly to the car sills, or pivotal trucks; and the present invention comprises two longitudinal levers (at each side) secured to the axle box pedestals at their outer ends, and movable with the same, and which are connected together by a short link at the center and fulcrumed between the link and the power ends of said lever. Thus should one end of the car, or truck, be depressed by reason of the superior weight at that end the axle box pedestals themselves, and directly therethrough, will transmit the depression to the levers which will in a corresponding way depress the other end of the car, or truck, bringing the car body level and practically parallel with the longitudinal centers of the truck axles.

My invention therefore consists in the structure herein shown and described and further pointed out in the claims.

In the drawings Figure 1 is a side elevation of a truck to which my invention has been applied. Fig. 2 is a plan of the bottom of the same, and Fig. 3 is a side elevation of a modified form of union of the equalizing levers.

Like numerals have reference to the same parts throughout the several views.

In the structure shown herein the truck comprises a movable and a stationary frame. The stationary frame is that part of the truck upon which the car body rests, which is supported by the car springs; and which has, further, the same amplitude of movement as the car body itself, and to which the axle box pedestals are secured. So far as my present invention is concerned, however, the upper chord may be omitted and the axle box pedestals may be secured directly to the car sill.

The form of pedestal shown herein comprises spring posts secured either to the upper chord, or the car sill, which are tied together at the bottom by what is known as the "pedestal tie bar," the spring post form being the equivalent of the housing, or horn plate structure, also known as an "axle box pedestal." The stationary part of the truck frame in this case consists of the axle box frame, which comprises the longitudinal, or side, bars supported upon the axle boxes and united transversely by the cross bars at the ends, or at any point of the length of the said side bars.

It is customary in railway practice to place between the axle boxes and side bars of the axle box frame elastic cushions, so as to elastically, or resiliently, support the side bars upon the axle boxes; but the movement due to the compression of the said elastic cushions on the axle boxes is not of the same amplitude as that of the car body, or upper chord, and therefore for the sake of clearness, both in the description and claims, I have termed one "the movable frame" and the other "the stationary frame."

Referring to the drawings, 1 represents the truck axles; 2 the wheels therefor, and 3 the axle boxes of any suitable construction.

The axle box frame comprises the side bars 4 made up of flat bars juxtaposed, and set on end, which are united to the ears 5 shown in the dotted lines, Fig. 1, of the yokes 6, which rest upon the axle boxes, the outer ears having the extensions 7 of the side bars (constructed the same as the section 4 and which are secured to the outer ears) between which rise the thimbles 8 which extend upwardly above the extensions, and to which are secured the cross bars 9 by suitable bolts. The cross bars 10 which are secured by bolts 11 passing into the ears 5 of the yokes keep the yokes in place on the axle boxes.

The foregoing constitutes the stationary frame of the truck, and between the axle boxes 3 and the bottom of the yokes 6 can be located elastic cushions as before set forth.

At 12 is shown the upper chord, which is rectangular in shape and lies directly above the side and cross bars of the axle box frame. Secured by the nuts 13, or otherwise, as desired, are spring posts 14 which pass down through the ears 5 of the yokes 6, the spring posts being tied together at the bottom by the pedestal tie bar 15; and surrounding the springs and extending between the upper chord and the ears of the yokes are the spiral car springs 15. The nut 13, which lies below the top chord, can be used as a spring plate or cup, if desired. This constitutes the movable part of the truck frame, and instead of the spring posts being secured to an upper chord they can be fixed directly to the sill of the car, the said spring posts constituting in the present instance a form of axle box pedestal.

The equalizing devices are secured at their power ends directly to the axle box pedestals in the following manner: The pedestal tie bar 15, or its equivalent, is provided with bifurcated bosses 16 depending therefrom, the ears of which are apertured for the purpose of permitting a bolt 17 to pass there-through. Depending from the side bars of the axle box frame and from any suitable point between the axle box pedestals, are the jaw bolts 18 having the shoulder 19 abutting against the lower part of the side bars, the screw threaded stem 20 of which passes up between the side bars, (or through the same if the said bars are solid) the jaw bolts being secured in place and supported by the plate 21 and nut 22.

As both sides of the truck are constructed alike, a description of the device at one side will suffice for both.

The ears of the jaw bolt 18 are apertured, to permit a bolt 23 to pass there-through, and lying within the ears of the bosses 16 and the jaw bolt 18 and supported by the bolts 17, 23, are the parallel rods or levers 24, 25, the rods being fulcrumed between the power and the weight, making them levers of the first order, the fulcrum being at 23, and the power at 17. The rod, or lever, 25 has a goose neck 26 at its inner end, between which and the inner end of the lever 24 extends the link 27, the bolts 28, 29, which pass through the levers and link making the connection a pivotal one, as are all of the other connections of both levers.

It is apparent that should the springs at one end of the truck become depressed by superior weight at that end, one of the levers, say, for instance, 24, would be vibrated downwardly at 17, which would lift the link and inner end of the lever 25, but depressing its other end, which would compress the springs at that point, equalizing the load at both ends of the car.

In Fig. 3 is shown a simple arrangement of means for assisting the lever 24 to elevate the inner end of the lever 25. The bolts uniting the link 27 and levers 24, 25 may in time work loose, (as may the other connections) causing looseness and lost motion in the various parts. Under these conditions the link may assume the position shown in Fig. 3, or one directly opposite (that is, as in Fig. 1) and in either of these positions its power to lift the lever 25 is lessened and the time in doing so lengthened on account of such lost motion. The lever 24 has an upwardly extending stud 30 which lies directly below the end of the lever 25, and is adapted to ride freely between the parts of the link and the goose neck 26. Should the left hand end (for example) of the car move down, the stud will strike the lever 25 and take the strain of lifting it from the link. The link will lift, as before described, should the other end of the car move down first.

The parts are shown in an arbitrary position for the purpose of illustration of the capacity of the stud.

Instead of uniting the levers 24, 25 by a link, as shown, one of said levers could be provided with a segmental slot or groove, and the opposing lever engaged therewith by a bolt or like means. When this is used the stud 30 can be omitted. In this way the union of the two levers could be made in the same plane, and thereby do away with the upwardly extending link.

The spring post form of axle box pedestal can be substituted by any form of pedestal which moves with the car body and which primarily operates the power end of the equalizing bars or levers.

It is apparent that many changes and modifications can be made in the nature of my present invention without departing from the spirit of the same.

Having described my invention, I claim—

1. The combination with the axle box pedestals adapted to move with the car springs, of articulated devices secured to and moved by, and extending between the pedestals and fulcrumed from a stationary portion of the truck frame, substantially as described.

2. The combination with the axle box pedestals, of levers fulcrumed to a stationary part of the truck and supported between said pedestals, the power end of said levers being connected to said pedestals, substantially as described.

3. The combination with the axle box pedestals, of levers of the first order secured at their "power" ends to the axle box pedestals, a stationary fulcrum for said levers, and means for operatively connecting the "weight" ends of said levers, substantially as described.

4. The combination with the upper chord, or car body, of the spring posts secured thereto, axle box yokes, springs between the car body, or upper chord and the yokes, and surrounding the spring posts, a tie bar uniting the spring posts, and articulated levers extending between the said tie bars and pivotally supported by the yokes, substantially as described.

5. The combination in a truck, of the upper chord, or car body, and the axle box frame, of the axle box pedestals, the jaw bolts depending from the axle box frame and between the pedestals, and levers secured to said pedestals and fulcrumed to the jaw bolts, and having a connecting link uniting their inner ends, substantially as described.

6. The combination with the axle box pedestals, of the tie bars 15 having the bifurcated bosses 16, the side bars 4 having the bifurcated jaw bolt 18 depending therefrom, the lever 24 secured to the boss 16 and fulcrumed in the jaw bolt 18, the lever 25 having the goose neck 26 supported in like manner, the goose neck rising above the lever 24, and an inclined link 27 extending between the two levers, substantially as described.

7. The combination with a truck of an axle box frame and an upper chord, or car, the upper chord being movable in relation to the axle box frame, axle box pedestals and articulated levers secured at their power ends to the axle box pedestals, fulcrumed on the axle box frame, and lying below said frame and between the axle box pedestals, substantially as described.

8. The combination with the levers 24, 25 united by the link 27, of the stud 30 on the lever 24 lying below the end of the lever 25, substantially as described.

Signed at Wilmington, in the county of New Castle and State of Delaware, this 8th day of February, 1893.

JOHN GOSNEY.

Witnesses:
   JNO. T. DUNLAP,
   JAMES MONAGHAN.